United States Patent
Aradachi et al.

(10) Patent No.: US 6,949,914 B2
(45) Date of Patent: Sep. 27, 2005

(54) CHARGING APPARATUS

(75) Inventors: Takao Aradachi, Ibaraki (JP); Nobuhiro Takano, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 111 days.

(21) Appl. No.: 10/680,234

(22) Filed: Oct. 8, 2003

(65) Prior Publication Data

US 2004/0075417 A1 Apr. 22, 2004

(30) Foreign Application Priority Data

Oct. 11, 2002 (JP) .................................. P. 2002-299088
Oct. 11, 2002 (JP) .................................. P. 2002-299089

(51) Int. Cl.[7] .................................................. H02J 7/04
(52) U.S. Cl. ...................................................... 320/150
(58) Field of Search ................................ 320/150, 153, 320/134

(56) References Cited

U.S. PATENT DOCUMENTS 6,114,839 A * 9/2000 Takano et al. ............... 320/150
6,204,639 B1 * 3/2001 Takano et al. ............... 320/150
6,275,009 B1 * 8/2001 Sakakibara et al. ......... 320/134
6,433,517 B2 * 8/2002 Sakakibara .................. 320/153

* cited by examiner

Primary Examiner—Pia Tibbits
(74) Attorney, Agent, or Firm—McGinn & Gibb, PLLC

(57) ABSTRACT

A charging apparatus includes a cooling fan; a battery temperature detecting unit; and a control unit configured to determine presence or non-presence of cooling effect by the cooling fan, and to control a charging current based on an output of the battery temperature detecting unit. When there is no cooling effect and the battery temperature reaches a first predetermined value smaller than a maximum value of a temperature range in which a battery is chargeable without making a life time thereof shorter, the control unit changes the charging current to a first charging current value where increase of the battery temperature can be suppressed. When there is cooling effect and the battery temperature reaches a second predetermined value higher than the first predetermined value, the control unit changes the charging current to a second charging current value larger than the first charging current value.

6 Claims, 14 Drawing Sheets

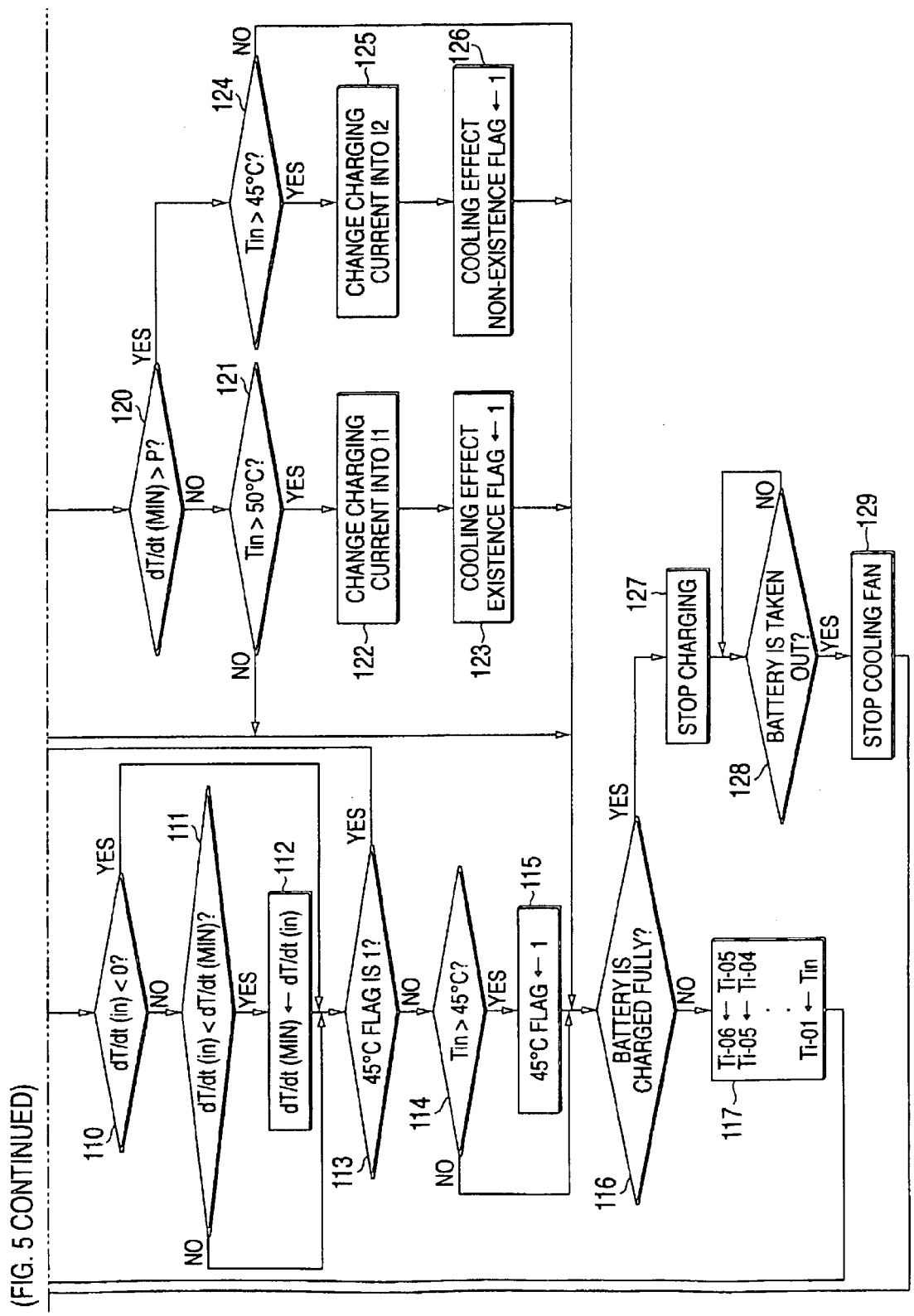

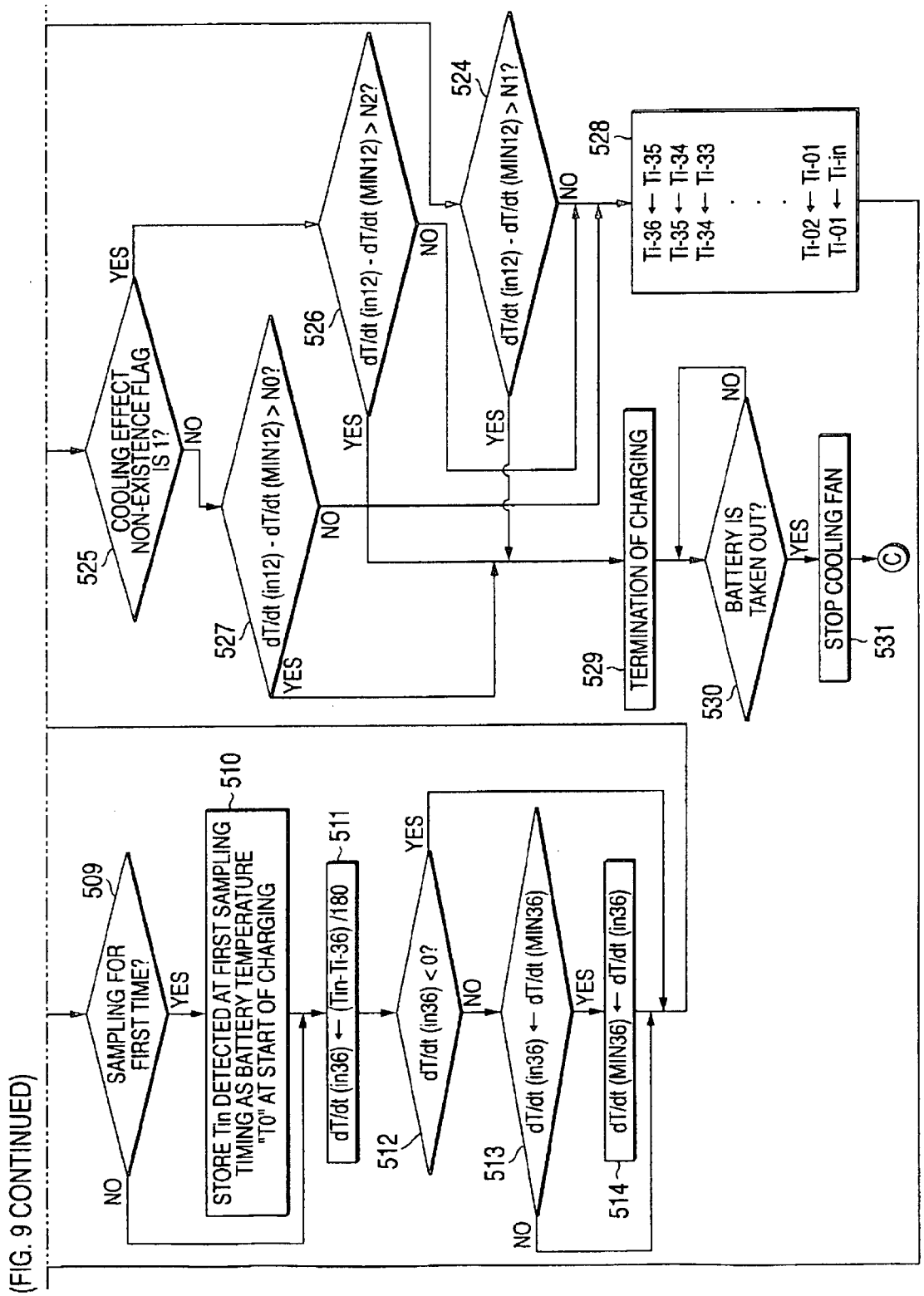

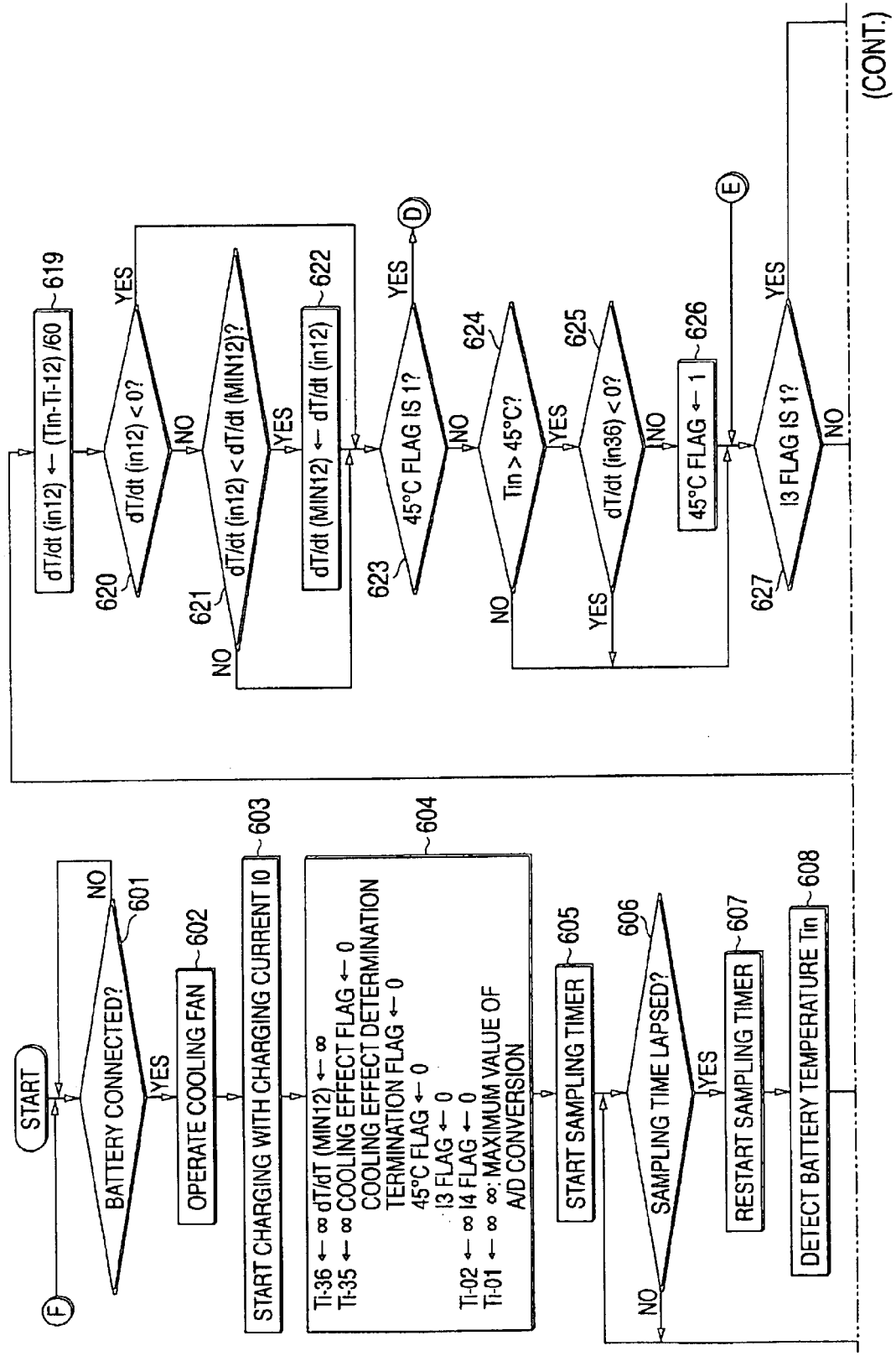

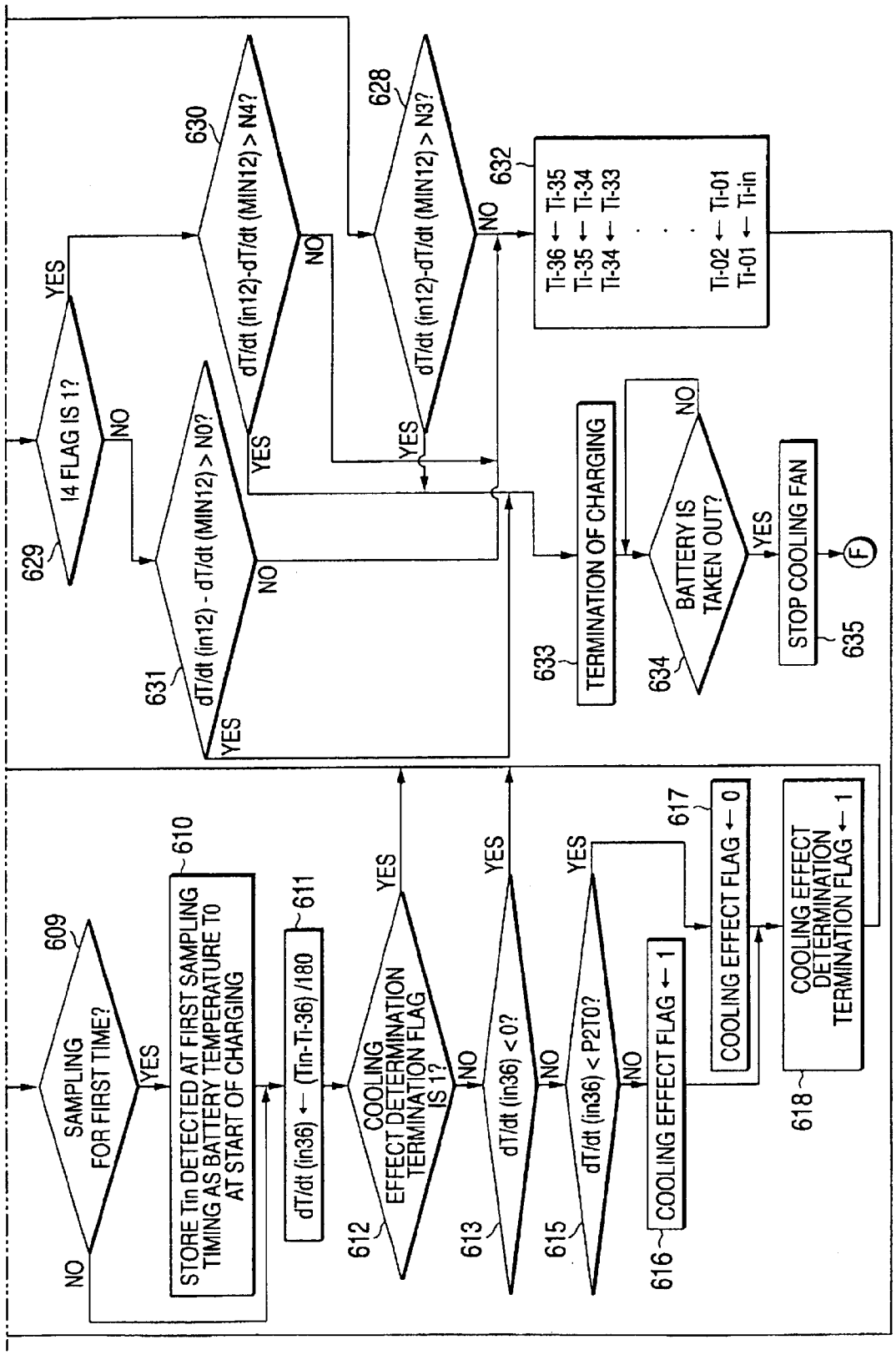

CHARGING APPARATUS

BACKGROUND OF THE INVENTION

1. Field of the Invention

The present invention relates to a charging apparatus for charging secondary batteries such as nickel cadmium batteries, and nickel hydrogen batteries.

2. Background Art

In the case of charging a battery pack such as a nickel cadmium battery or a nickel hydrogen battery used as a power source for a cordless tool etc., although the battery pack can be charged in a short time when charged with a large current, an amount of heat generated from the battery within the battery pack during charge becomes large and so the cycle life of the battery becomes shorter. Thus, a charging apparatus is proposed that charges a battery pack with a small charging current for a long time in order to suppress the heat amount of the battery.

On the other hand, another charging apparatus is proposed that charges a battery pack with a large charging current while cooling the battery pack by a cooling fan provided at a charging apparatus thereby to charge the battery pack in a short time with suppressing the heat amount of the battery pack during charge.

The aforesaid two charging apparatuses differ in their charging methods depending on whether or not the battery pack can cope with the forced cooling, that is, whether or not the battery pack is provided with a structure such as an air hole with respect to air blown from a cooling fan. In view of the fact that the charging method differs in this manner between the battery pack with a cooling device and the battery pack without a cooling device, a charging method is proposed which determines whether or not the rising rate of temperature of the battery at the time of start of charging is more than a predetermined value thereby to determine the non-existence or existence of the cooling effect on the battery pack due to the cooling fan, and an average charging current is made large when the cooling effect exists, whilst the average charging current is made small when the cooling effect does not exist (see U.S. Pat. No. 6,204,639, for example).

As a method of determining the full charge of a battery pack, there is proposed a dT/dt detection method which detects that a battery is fully charged when a battery temperature increasing rate calculated at some sampling interval increases by a predetermined value or more from the minimum value within a battery temperature increasing rate storing unit (see JP-A-6-113475, for example).

However, according to the charging method which selects the average charging current depending on the non-existence or existence of the cooling effect, there arises a problem that the cooling ability is not brought to the maximum and so the charging time can not be made shorter even for the battery pack a the cooling device.

For example, as shown in the charging characteristics of FIG. 1, in the case where a charging control method is employed which changes the charging current from a value I0 to a value I2 when the battery temperature reaches a predetermined temperature (45° C.) after the start of the charging, the charging time of the battery pack with a cooling device can be made shorter than that of the battery pack without a cooling device. However, since the charging time with the charging current I2 is long, the battery pack with a cooling device does not fully use the cooling ability thereof.

Further, it is unreasonable to determine the presence or non-presence of cooling effect by simply using the battery temperature increasing rate calculated at a sampling interval used for determining the full charge in the dT/dt detection method.

This will be explained with reference to FIGS. 2 and 3. FIGS. 2 and 3 are graphs showing changes of battery voltages, charging currents and a battery temperature changing rate (A/D conversion value) at a first sampling interval used for determining full charge at the time of charging the battery pack with a cooling device and the battery pack without a cooling device and showing changes of a battery temperature changing rate (A/D conversion value) at a second sampling interval (>the first sampling interval) used for determining the existence or non-existence of cooling effect, wherein a battery temperature K described in the abscissa represents a time where the battery temperature reaches a predetermined value K. A minimum battery temperature changing rate until the battery temperature reaches a predetermined battery temperature K is small in difference between the battery pack with a cooling device and the battery pack without a cooling device in the case of the battery temperature changing rate at the first sampling interval, but large indifference between the battery pack with a cooling device and the battery pack without a cooling device in the case of the battery temperature changing rate at the second sampling interval. In this manner, it is difficult to determine the existence or non-existence of cooling effect by simply using the battery temperature changing rate calculated at the sampling interval used for determining the full charge in the dT/dt detection method. Further, the detection of full charge may be delayed and so the battery may be overcharged at the time of detecting full charge based on the battery temperature changing rate at the second sampling interval.

Further, since the battery temperature changing rate from the start of charging differs depending on the battery temperature at the time of starting charge, it is unreasonable to determine the existence or non-existence of cooling effect to determine a charging current simply depending on whether or not the battery temperature changing rate at the time of starting charge is equal to or more than the predetermined value.

SUMMARY OF THE INVENTION

Accordingly, an object of the present invention is to obviate the aforesaid problems of the conventional technique, and to provide a charging apparatus which can perform suitable charging control depending on a battery pack with a cooling device or a battery pack without a cooling device, that is, depending on the existence or non-existence of the cooling effect on the battery pack, and in particular can make the charging time of the battery pack with a cooling device shorter.

Another object of the invention is to obviate the aforesaid drawbacks of the conventional technique and to provide a charging apparatus which can accurately detect full charge of a battery regardless of a battery pack with a cooling device and a battery pack without a cooling device and accurately discriminate between a battery pack with a cooling device and a battery pack without a cooling device.

To achieve the object, the invention provides a charging apparatus, including: a cooling fan for cooling a battery pack; a battery temperature detecting unit configured to detect a battery temperature of the battery pack; and a control unit configured to determine presence or non-presence of cooling effect, to determine full charge of the battery and to control a charging current based on an output of the battery temperature detecting unit; wherein, when the control unit determines that there is no cooling effect by the cooling fan and the battery temperature reaches a first predetermined value smaller than a maximum value of a temperature range in which the battery is chargeable without making a life time thereof shorter, the control unit changes the charging current to a first charging current value where increase of the battery temperature due to charging is suppressed; and wherein, when the control unit determines that there is cooling effect by the cooling fan and the battery temperature reaches a second predetermined value higher than the first predetermined value, the control unit changes the charging current to a second charging current value larger than the first charging current value.

The invention may be arranged in a manner that a battery temperature changing rate is calculated by using a first sampling interval and a second sampling interval which is longer than the first sampling interval, a full charge state of a battery pack is determined by the battery temperature changing rate with the first sampling interval, and existence or non-existence of cooling effect due to the cooling fan is determined by a battery temperature changing rate with the second sampling interval.

The invention may be arranged in a manner that existence or non-existence of cooling effect due to a cooling fan is determined depending on whether or not a minimum value of the battery temperature changing rates when the battery temperature reaches a predetermined temperature is larger than a preset first predetermined value.

Preferably, the first predetermined value for determining the existence or non-existence of cooling effect is set in correspondence with a battery temperature at the time of start of charging.

The invention may be arranged in a manner that existence or non-existence of cooling effect due to the cooling fan is determined depending on whether or not a battery temperature changing rate calculated for the first time is larger than a preset second predetermined value.

Preferably, the second predetermined value for determining the existence or non-existence of cooling effect is set in correspondence with a battery temperature at the time of start of charging.

BRIEF DESCRIPTION OF THE DRAWINGS

The present invention may be more readily described with reference to the accompanying drawings:

FIG. 11 is a former part of a flowchart for explaining the operation in the case of determining the existence or non-existence of cooling effect depending on whether or not the battery temperature changing rate just after calculated by the battery temperature changing rate with a second sampling interval according to the cooling fan in the charging apparatus of the invention is larger than a preset second predetermined value.

DETAILED DESCRIPTION OF THE PREFERRED EMBODIMENTS

The First Preferred Embodiment

Figure 4:
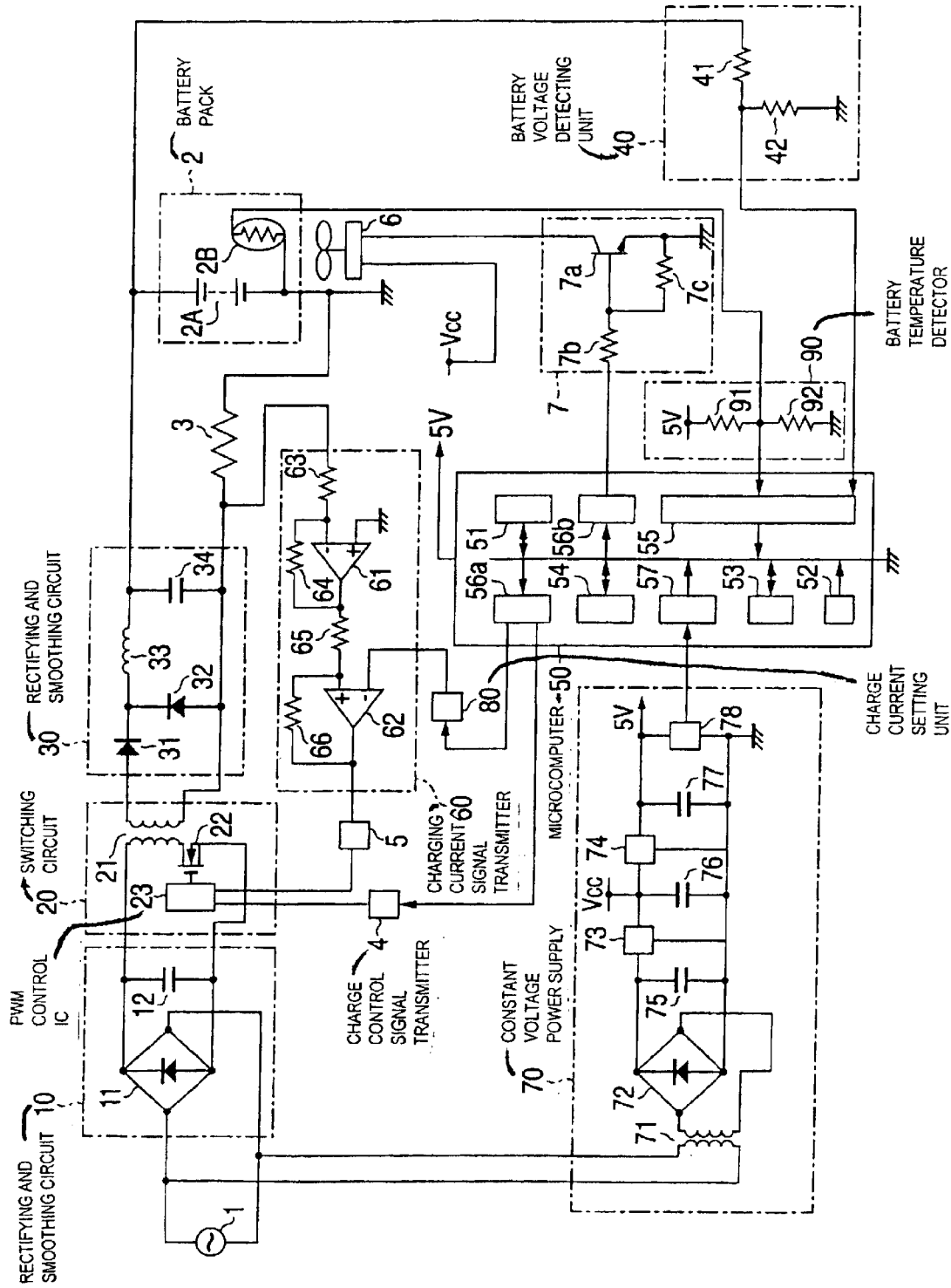
FIG. 4 is a circuit block diagram showing a first embodiment of the charging apparatus according to the invention.

FIG. 4 is a circuit block diagram showing a first embodiment of the invention. In the figure, 1 depicts an AC power supply, and 2 depicts a battery pack provided with a battery set 2A formed by a plurality of battery cells connected in series and a temperature detecting element 2B such as a thermistor which is made in contact with or disposed near the battery set 2A to detect the temperature of the battery. 3 depicts a current detecting unit for detecting a charging current flowing into the battery pack 2, 4 depicts a charge control signal transmitting unit which transmits a signal for controlling the start and stop of the charging current, and 5 depicts a charging current signal transmitting unit for feeding back the signal of the charging current to a PWM control IC 23. Each of the charge control signal transmitting unit 4 and the charging current signal transmitting unit 5 is formed by a photo coupler etc. for example. 6 depicts a cooling fan for cooling the battery pack 2, and 7 depicts a driving unit for driving the cooling fan 6. The driving unit is formed by a transistor 7a and resistors 7b, 7c and controls the driving of the cooling fan 6 in accordance with the output of the output port 56b of a microcomputer 50. 10 depicts a rectifying and smoothing circuit formed by a full-wave rectifying circuit 11 and a smoothing capacitor 12. 20 depicts a switching circuit formed by a high-frequency transformer 21, a MOS FET 22 and the PWM control IC 23. The PWM control IC 23 is a switching power supply IC which changes the driving pulse width of the MOS FET 22 to thereby adjust the output voltage of a rectifying and smoothing circuit 30. 30 depicts the rectifying and smoothing circuit formed by diodes 31, 32, a choke coil 33 and a smoothing capacitor 34.

40 depicts a battery voltage detecting unit which is formed by resistors 41, 42 and divides the terminal voltage of the battery pack 2. 50 depicts the microcomputer formed by a calculation unit (CPU) 51, a ROM 52, a RAM 53, a timer 54, an A/D converter 55, output ports 56a, 56b, and a reset input port 57. The CPU 51 performs such a calculation of obtaining a battery temperature changing rate based on a newest battery temperature and a battery temperature sampled before plural sampling time periods and stored in the RAM 53. 60 depicts a charging current control unit formed by operational amplifiers 61, 62 and resistors 63 to 66. 70 depicts a constant voltage power supply which is formed by a power supply transformer 71, a full-wave rectifying circuit 72, three-terminal regulators 73, 74, smoothing capacitors 75 to 77, and a reset IC 78. The constant voltage power supply serves as a power supply for the cooling fan 6, the microcomputer 50, the charging current control unit 60 etc. The reset IC 78 outputs a rest signal to the reset input port 57 in order to set the microcomputer 50 in an initial state. 80 depicts a charging current setting unit which sets the charging current and changes a voltage value to be applied to the inverted input terminal of the operational amplifier 62 in correspondence to a signal from the output port 56a. 90 depicts a battery temperature detecting unit formed by resistors 91, 92 The battery temperature detecting unit is configured to input a voltage divided by the resistor 91 connected to a constant voltage source of 5 volt, the resistor 92 and the temperature detecting element 2B within the battery pack 2 to the A/D converter 55 of the microcomputer 50, to detect the temperature of the battery and to control the charging.

Figure 5:
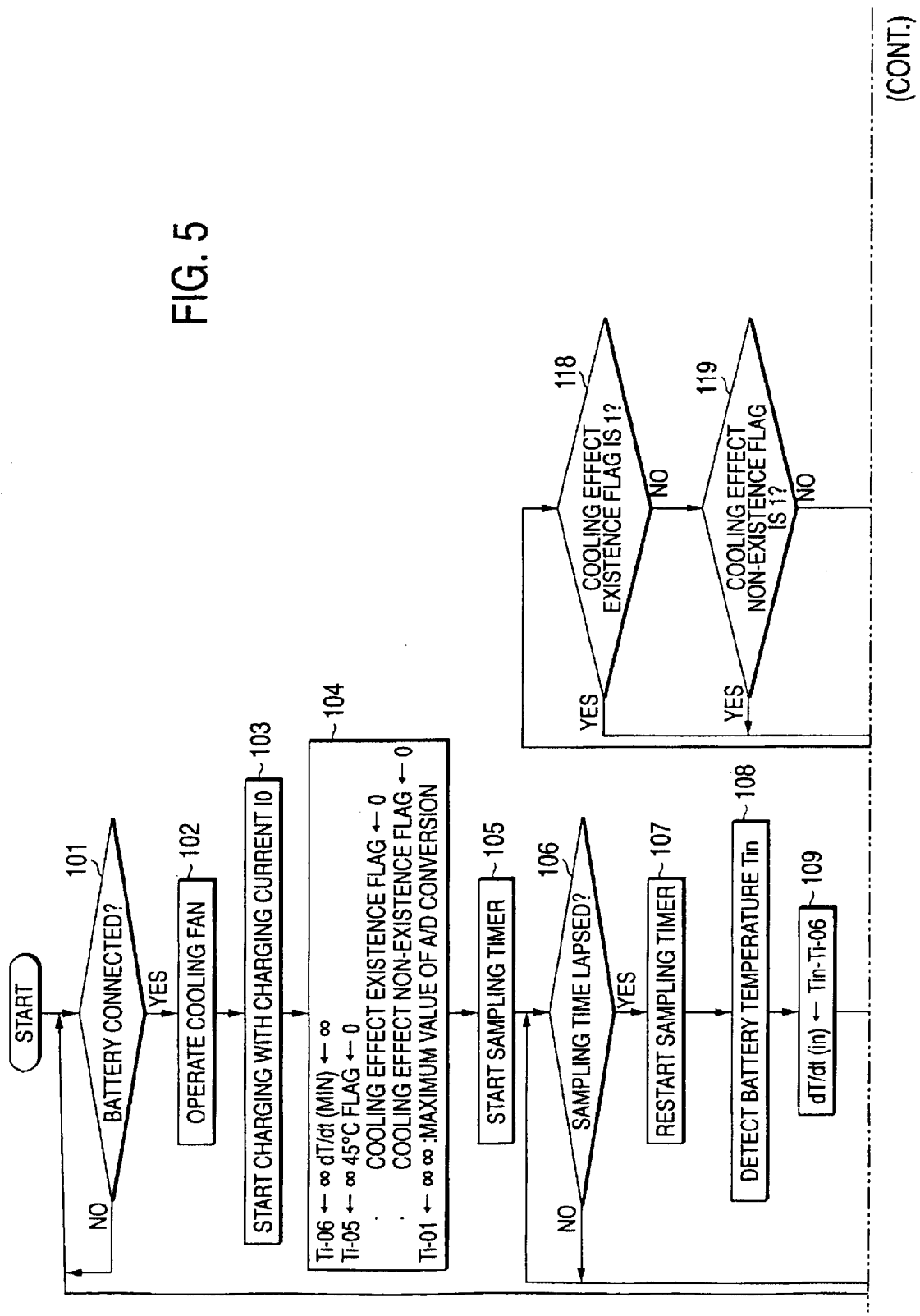
FIG. 5 is a flow chart for explaining the operation of the charging apparatus according to the invention.

Next, an example of the operation of the charging apparatus according to the invention will be explained with reference to the circuit diagram shown in FIG. 4 and the flowchart shown in FIG. 5.

When the power supply is turned on, the microcomputer 50 performs the initial setting of the output ports 56a, 56b and is placed in a state of waiting for the connection of the battery pack 2 (step 101). When the battery pack 2 is connected, the microcomputer 50 determines that the battery pack is connected based on a signal from the battery voltage detecting unit 40. Next, the microcomputer operates the cooling fan 6 from the output port 56b through the driving unit 7 (step 102). Then, the microcomputer transmits a charge start signal to the PWM control IC 23 from the output port 56a through the charge control signal transmitting unit 4 and also applies a charging current setting reference voltage value Vio to the operational amplifier 62 from the output port 56a through the charging current setting unit 80 thereby to start the charge by a charging current I0 (step 103). The current detecting unit 3 detects the charging current flowing into the battery pack 2 which flows simultaneously with the start of the charging. Then, a difference between a voltage corresponding to the charging current thus detected and the charging current setting reference voltage value Vio is fed back from the charging current control unit 60 to the PWM control IC 23 through the charging current signal transmitting unit 5. That is, a pulse with a smaller pulse width is applied to the high-frequency transformer 21 when the charging current is large, whilst a pulse with a larger pulse width is applied to the high-frequency transformer when the charging current is small.

The pulses from the high-frequency transformer is smoothed into the DC current by the rectifying and smoothing circuit 30 thereby to keep the charging current constant. In other words, the charging current is controlled to be the predetermined current value I0 through the current detecting unit 3, the charging current control unit 60, the charging current signal transmitting unit 5, the switching circuit 20 and the rectifying and smoothing circuit 30.

Then, the microcomputer initially sets the battery temperatures at the preceding six sampling time points Ti-06, Ti-05, - - -, Ti-01 stored in the RAM 53, the minimum value dT/dt(MIN) of the battery temperature changing rate calculated from a difference between the newest battery temperature and the battery temperature sampled at the preceding six-th sampling time point, and respective determination flags, that is, a 45° C. flag, a cooling effect existence flag and a cooling effect non-existence flag (step 104), and starts a battery temperature sampling timer (step 105). The microcomputer starts the sampling timer again (step 107) when a sampling timer time Δt passes (step 106).

Next, the voltage of 5V is divided by the resistors 91, 92 of the battery temperature detecting unit 90 and the temperature detecting element 2B, then the A/D converter 55 subjects the voltage thus divided to the A/D conversion and the CPU fetches the voltage thus A/D converted as a battery temperature Tin (step 108). Then, the CPU 51 obtains a newest battery temperature changing rate, that is, dT/dt(in)= Tin-Ti-06 from a difference between the Tin and the data Ti-06 of the preceding six-th sampling time point (step 109) and determines whether or not the dT/dt(in) is negative (step 110). When the dT/dt(in) is determined to be negative, the process proceeds to step 113. In contrast, when the dT/dt(in) is determined to be positive, the CPU compares the newest battery temperature changing rate dT/dt(in) with the minimum value dT/dt(MIN) of the battery temperature changing rate stored in the RAM 53 (step 111). When the dT/dt(in) is determined to be larger than the dT/dt(MIN), the process skips step 112, whilst when the dT/dt(in) is determined to be equal to or smaller than the dT/dt(MIN) in step 111, the CPU updates the stored data dT/dt(MIN) to the newest battery temperature changing rate dT/dt(in) (step 112).

Next, it is determined whether or not the cooling effect due to the cooling fan 6 exists. First, it is determined whether or not the 45° C. determination flag within the RAM 53 for determining whether or not the battery temperature reaches the predetermined temperature 45° C. is 1 (step 113). When the 45° C. determination flag is determined to be 1, it is determined that the temperature of the battery 2 reaches 45° C. and then it is determined whether or not the cooling effect existence flag of the RAM 53 is 1 (step 118). When the cooling effect existence flag is determined to be 1, the process proceeds to a battery full charge determination process of step 116.

In step 118, when the cooling effect existence flag is determined not to be 1, that is, 0, then it is determined whether or not the cooling effect non-existence flag is 1 (step 119). When the cooling effect non-existence flag is determined to be 1, the process proceeds to the battery full charge determination process of step 116.

In step 119, when the cooling effect non-existence flag is determined not to be 1, that is, 0, then it is determined whether or not the cooling effect due to the cooling fan 6 exists by determining whether or not the minimum value dT/dt(MIN) of the battery temperature changing rate is larger than a predetermined temperature changing rate P (step 120). When the minimum value is determined to be larger than the temperature changing rate P, it is determined that the cooling effect of the battery pack 2 due to the cooling fan 6 does not exist, and then it is determined whether or not the newest battery temperature Tin is higher than the preset predetermined temperature 45° C. (step 124). When the newest battery temperature is determined to be equal to or lower than the redetermined temperature 45° C., the process proceeds to the battery full charge determination process of step 116.

In step 124, when the newest battery temperature Tin is determined to be higher than the predetermined temperature 45° C., a charging current setting reference voltage value Vi1 is applied to the operational amplifier 62 from the output port 56a through the charging current setting unit 80 thereby to change the charging current into the value I2 (I2<I0) (step 125). Then, the cooling effect non-existence flag of the RAM 53 is set to 1 (step 126) and the process proceeds to the battery full charge determination process of step 116.

In step 120, when the minimum value dT/dt (MIN) of the battery temperature changing rate is determined to be smaller than the predetermined temperature changing rate P, it is determined that the cooling effect of the battery pack 2 exists, and then it is determined whether or not the newest battery temperature Tin is higher than the preset predetermined temperature 50° C. (step 121). When the newest battery temperature is determined to be equal to or lower than the predetermined temperature 50° C., the process proceeds to the battery full charge determination process of step 116.

In step 121, when the newest battery temperature Tin is determined to be higher than the predetermined temperature 50° C., the charging current setting reference voltage value Vi1 is applied to the operational amplifier 62 from the output port 56a through the charging current setting unit 80 thereby to change the charging current into the value I1 (I1>I2, I1<I0) (step 122). Then, the cooling effect existence flag of the RAM 53 is set to 1 (step 123) and the process proceeds to the battery full charge determination process of step 116.

As is well known, there are various kinds of detection methods as the battery full charge determination process of step 116. For example, there is a well known −ΔV detection method which detects based on the output of the battery voltage detecting unit 40 that the battery voltage reduces by a predetermined voltage value from the peak voltage at the end stage of the charging. There is a second derivative detection method which detects that the second derivative value of the battery voltage with respect to time becomes negative in order to reduce the overcharging to improve the cycle life of the battery pack 2 by stopping the charging before the battery voltage reaches a peak value. There is also a ΔT detection method which detects based on the output of the battery temperature detecting unit 90 that a temperature increasing value of the battery pack from the start of charging becomes a predetermined temperature value or more. Further, there is a dT/dt detection method as disclosed in JP-A-62-193518, JP-A-2-246739, JP-UM-A-3-3468 etc., which detects that a battery temperature increasing rate (temperature changing rate) per a predetermined time at the time of charging becomes a predetermined value or more. One or more of these battery full charge state detection methods may be used in the embodiment.

In step 116, when the battery pack 2 is determined to be fully charged, the microcomputer 50 transmits a charging stop signal from the output port 56a to the PWM control IC 23 through the charge control signal transmitting unit 4 thereby to stop the charging (step 127). Next, it is determined whether or not the battery pack 2 is taken out (step 128). When the battery pack 2 is determined to be taken out, the CPU stops the cooling fan 6 from the output port 56b through the driving unit 7 (step 129), then the process returns to step 101 and is placed in a stand-by state of waiting for the next charging.

In step 116, when the battery pack 2 is determined not to be fully charged, the battery temperatures at the preceding six sampling time points Ti-06, Ti-05, - - - , Ti-01 and the battery temperature changing rates at the preceding six sampling time points dT/dt(i-06), dT/dt(i-05), - - - , dT/dt (i-01) stored in the RAM 53 are respectively moved to the storage areas at preceding one sampling time point in a manner that Ti-05→Ti-06, Ti-04→Ti-05, - - - , Tin→Ti-01 (step 117) and the process is returned to step 106 again.

Figure 1:
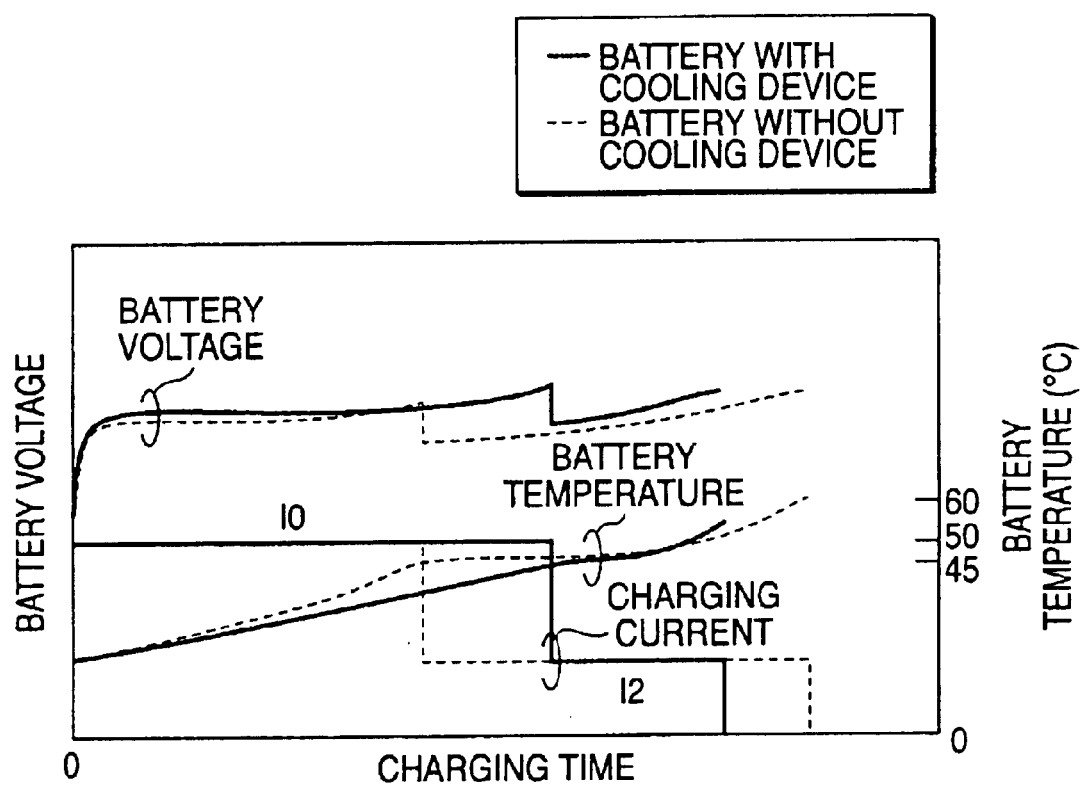
FIG. 1 is a graph showing charging characteristics of a battery pack with a cooling device and a battery pack without a cooling device of the conventional charging apparatus.
Figure 2:
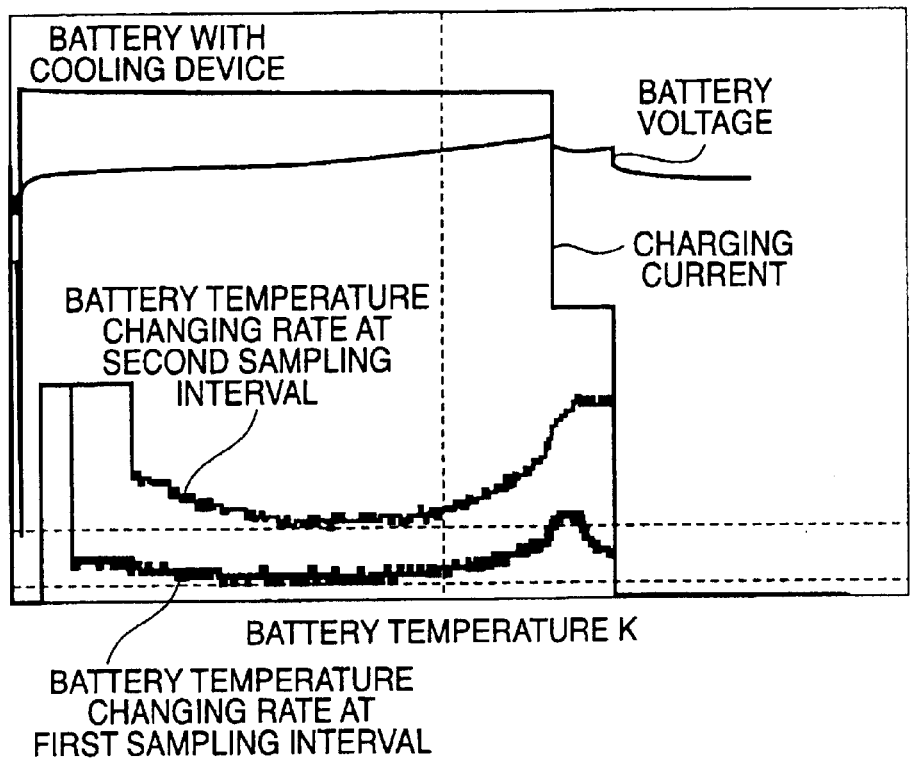
FIG. 2 is a graph showing changes of battery voltages, charging currents and battery temperature changing rates at first and second sampling interval used for determining full charge at the time of charging the battery pack with a cooling device.
Figure 3:
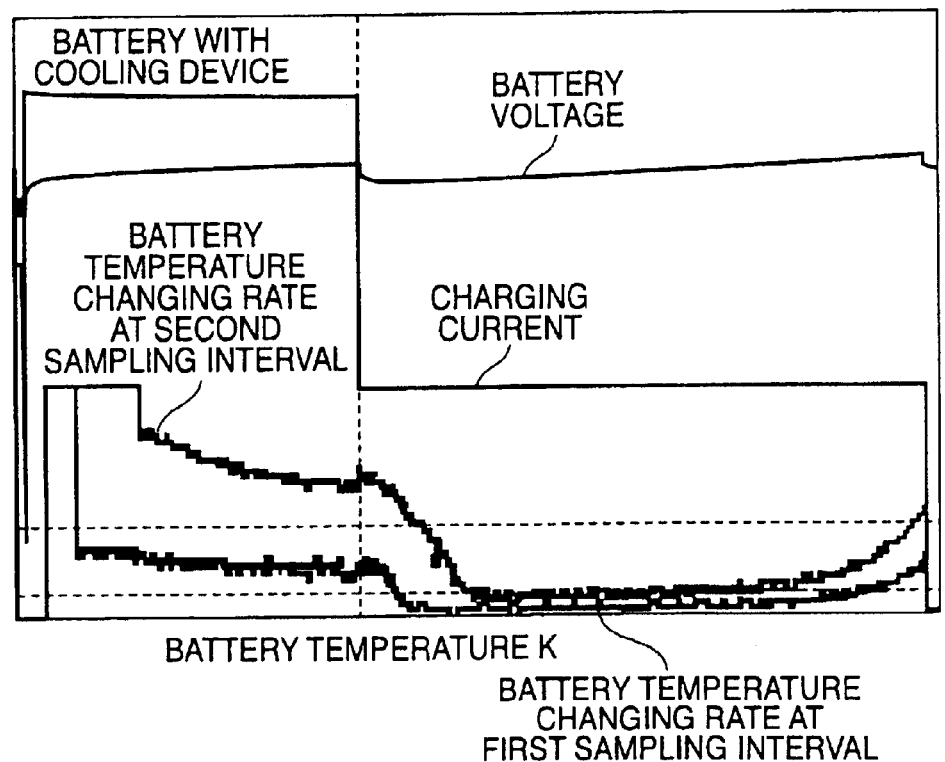
FIG. 3 is a graph showing changes of battery voltages, charging currents and battery temperature changing rates at first and second sampling interval used for determining full charge at the time of charging the battery pack without a cooling device.
Figure 6:
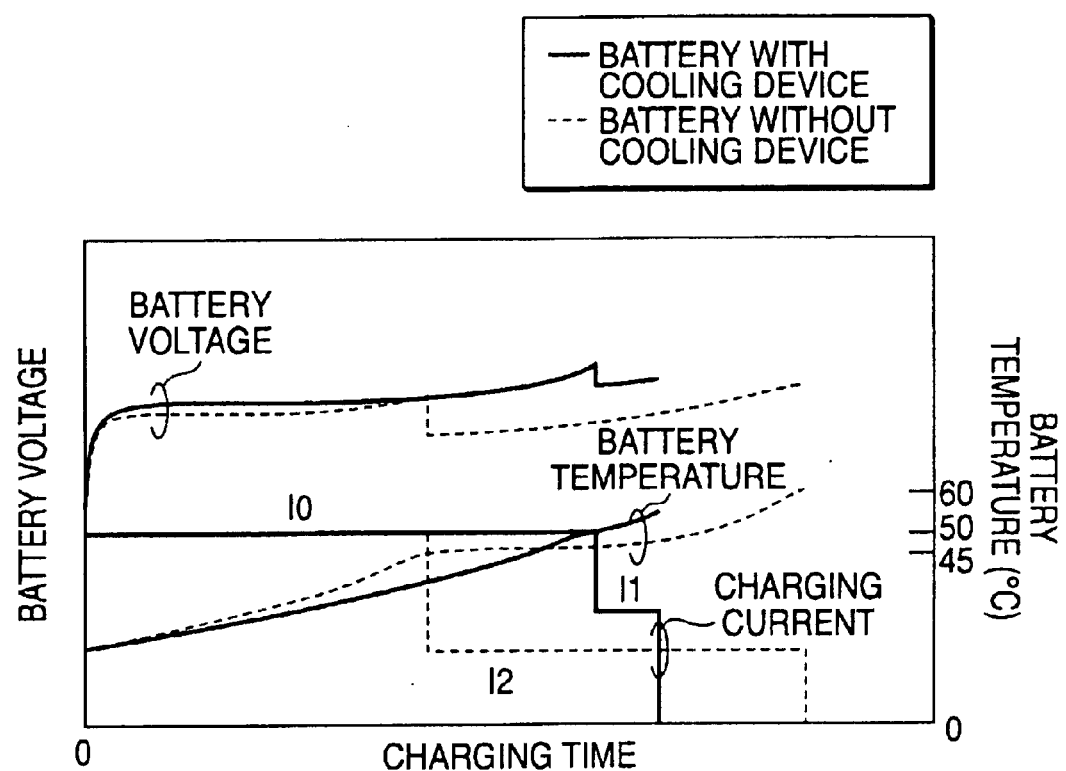
FIG. 6 is a graph showing charging characteristics of a battery pack with a cooling device and a battery pack without a cooling device of the charging apparatus according to the invention.

FIG. 6 shows the charging characteristics of the charging apparatus according to the embodiment. As compared with the charging characteristics of the example shown in FIG. 1, it will be understood that the charging time of the battery pack with a cooling device is made shorter as compared with the example of FIG. 1. This is because the suitable charging current and the temperature for changing the charging current are set in accordance with the battery pack with a cooling device based on the determination result as to whether or not the cooling effect exists.

In the aforesaid embodiment, although it is determined whether or not the cooling effect due to the cooling fan 6 exists when the battery temperature reaches 45° C. in step 113, the present invention is not limited thereto, and the setting temperature may be set in accordance with the specification of the battery set 2A and the cooling ability of the cooling fan 6.

Similarly, the setting temperatures in steps 121 and 124 are not limited to the aforesaid values, and these setting temperature may be set in accordance with the specification of the battery set 2A and the cooling ability of the cooling fan 6.

As described above, according to the invention, the suitable charging current and the battery temperature for changing the charging current are set based on the determination result as to whether or not the cooling effect due to the cooling fan exists, so that the charging time of the battery pack with a cooling device can be made shorter.

The Second Preferred Embodiment

Figure 7:
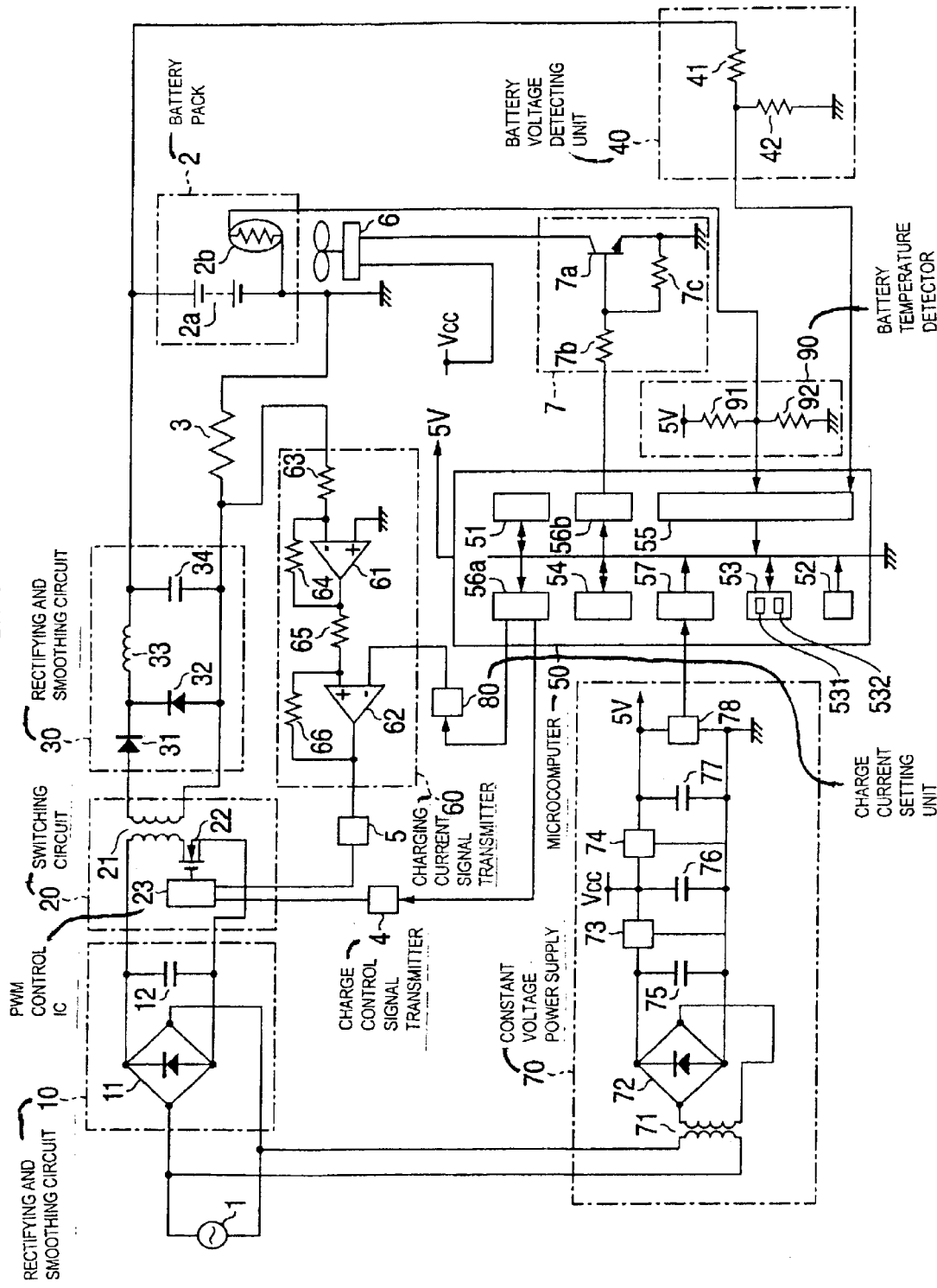
FIG. 7 is a circuit diagram showing a second embodiment of the charging apparatus according to the invention.

FIG. 7 is a circuit block diagram showing a second embodiment of a charging apparatus according to the invention.

In this second embodiment, elements common with those of the first embodiment will be referred by the same references and the explanations for the common elements will be omitted.

The configurations shown in FIG. 7 are broadly the same as those of the first embodiment shown in FIG. 4, but different in the configuration of the microcomputer 50. The microcomputer 50 is formed by a calculation unit (CPU) 51, a ROM 52, a RAM 53', a timer 54, an A/D converter 55, output ports 56a, 56b, and a reset input port 57. The CPU 51 calculates a plurality of battery temperature changing rates at every predetermined time period based on a newest battery temperature and a battery temperature sampled before plural sampling time periods, and compares a current battery temperature changing rate with a minimum battery temperature changing rate stored in the RAM 53'. The RAM 53' contains therein a battery temperature storage unit 531 for storing battery temperatures sampled before predetermined sampling time periods and a battery temperature changing rate storage unit 532 for storing a plurality of battery temperature changing rates at every predetermined time period based on a newest battery temperature and a battery temperature sampled before plural sampling time periods.

Figure 8:
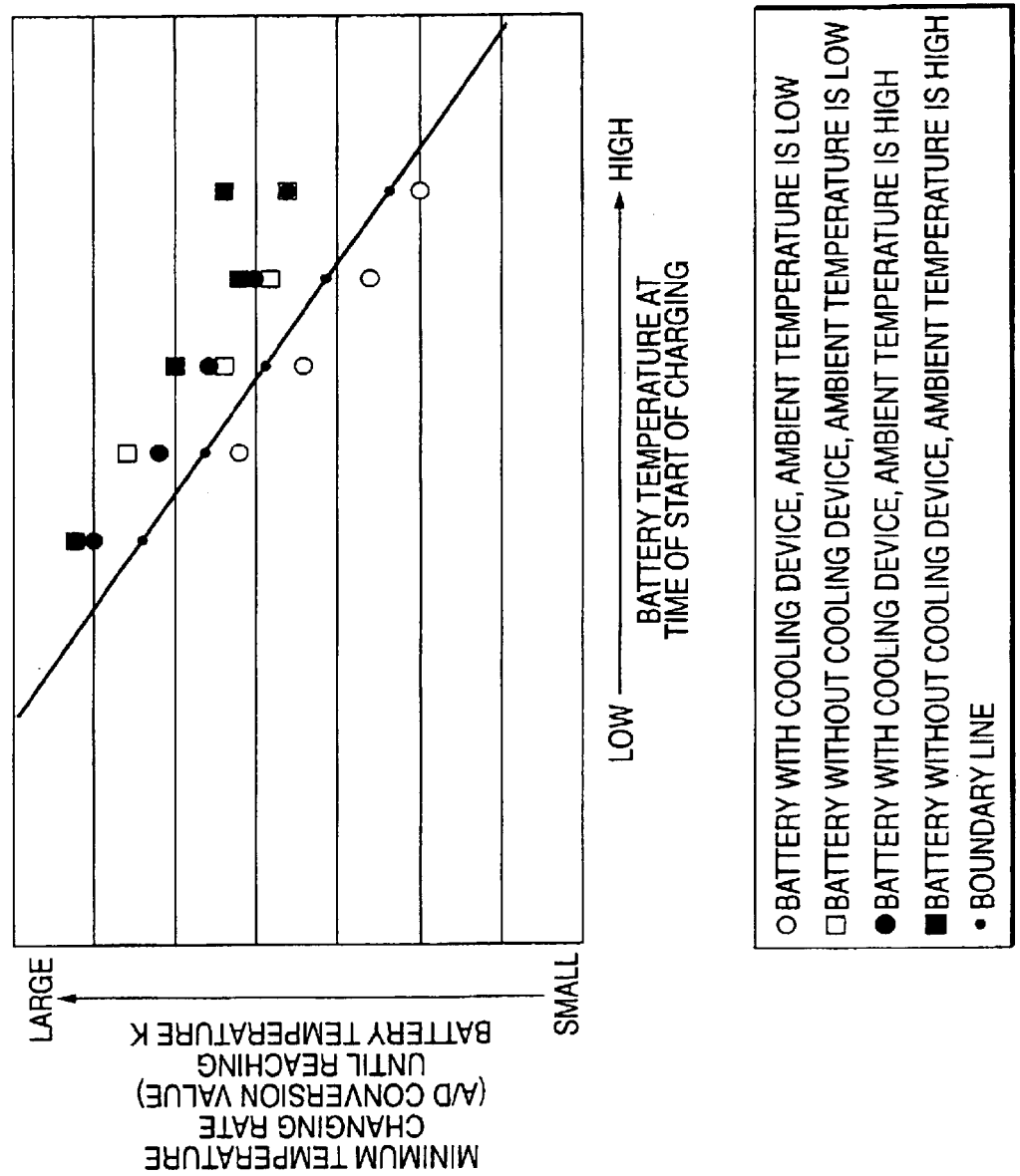
FIG. 8 is a graph showing determination criterion based on battery temperatures at the time of start of charging, at the time of determining the existence or non-existence of cooling effect depending on whether the minimum value of the battery temperature changing rate until reaching a predetermined temperature when the battery temperature reaches the predetermined temperature is larger than a predetermined value or not.

With reference to FIG. 8, explanation will be made as to a method of determining the existence or non-existence of the cooling effect due to the fan 6 depending on whether or not the minimum value of the battery temperature changing rate at the second sampling interval when the battery temperature during charging reaches the predetermined temperature K is larger than a first predetermined value.

FIG. 8 is an example of a graph showing determination criterion in which, at the time of determining the existence or non-existence of the cooling effect depending on whether the minimum value of the battery temperature changing rate until reaching a predetermined temperature K when the battery temperature during charging reaches the predetermined temperature K is larger than the first predetermined value or not, the first predetermined value for determining the existence or non-existence of the cooling effect is determined based on battery temperatures at the time of start of charging. In the figure, an abscissa represents a battery temperature at the time of starting charging and an ordinate represents a minimum battery temperature changing rate (A/D converted value) until the battery temperature reaches the predetermined temperature K. Dots within the figure show examples of the minimum battery temperature changing rates when each of the battery pack with a cooling device and the battery pack without a cooling device is charged while changing the ambient temperature and also changing the battery temperature at the time of start of charging.

As clear from FIG. 8, the minimum battery temperature changing rate at the time of reaching the predetermined temperature K is large when the battery temperature at the time of starting charging is low, whilst the minimum battery temperature changing rate is small when the battery temperature at the time of starting charging is high. Further, in the case where the battery temperature at the time of start of charging is same, the minimum battery temperature changing rate is small when the battery pack with a cooling device is charged in a low ambient temperature state, whilst the minimum battery temperature changing rate is large as compared with the case of charging the battery pack with a cooling device when the battery pack without a cooling device is charged in the low ambient temperature state. When the battery temperature at the time of starting charging is high, in each case of charging the battery pack with a cooling device and the battery pack without a cooling device, the minimum battery temperature changing rate is larger than the case where the battery pack with a cooling device is charged in the low ambient temperature state. In view of the aforesaid fact, when it is determined that the cooling effect exists in the case where the ambient temperature is low and where the minimum battery temperature changing rate is small, the first predetermined values for determining the existence or non-existence of the cooling effect in corresponding to the respective battery temperatures at the time of start of charging can se set on a boundary line as shown in FIG. 8.

As described above, when the minimum battery temperature changing rate exists in a region above the line in FIG. 8 based on the battery temperature at the time of start of charging when the battery temperature reaches the predetermined temperature K, it is determined that the cooling effect does not exist. In contrast, when the minimum battery temperature changing rate exists in a region below the line in FIG. 8, it is determined that the cooling effect exists. Thus, the charging current can be controlled based on the determination result.

Next, explanation will be made as to a method of determining the existence or non-existence of the cooling effect depending on whether or not the battery temperature changing rate obtained at the time of the first calculation using the second sampling interval is larger than a preset second predetermined value.

The battery temperature changing rate obtained at the time of the first calculation is large when the battery temperature at the time of start of charging is low, whilst the battery temperature changing rate obtained at the time of the first calculation is small when the battery temperature at the time of start of charging is high. Further, in the case where the battery temperature at the time of start of charging is same, when the battery pack with a cooling device is charged in the low ambient temperature state, the battery temperature changing rate obtained at the time of the first calculation is small. In contrast, when the battery pack without a cooling device is charged in the low ambient temperature state, the battery temperature changing rate obtained at the time of the first calculation is higher as compared with the case of charging the battery pack with a cooling device. In the state where the ambient temperature is high, in each case of charging the battery pack with a cooling device and the battery pack without a cooling device, the battery temperature changing rate obtained at the time of the first calculation is larger than that in the case of charging the battery pack with a cooling device in the low ambient temperature state. According to the aforesaid fact, second predetermined values for determining the existence or non-existence of the cooling effect in corresponding to the respective battery temperatures at the time of start of charging can se set on a boundary line in the same manner as FIG. 8. As described above, when the battery temperature changing rate just after the calculation exists in a region above the boundary line based on the battery temperature at the time of start of charging, it is determined that the cooling effect does not exist. In contrast, when the battery temperature changing rate just after the calculation exists in a region below the boundary line, it is determined that the cooling effect exists. Thus, the charging current can be controlled based on the determination result.

Figure 9:
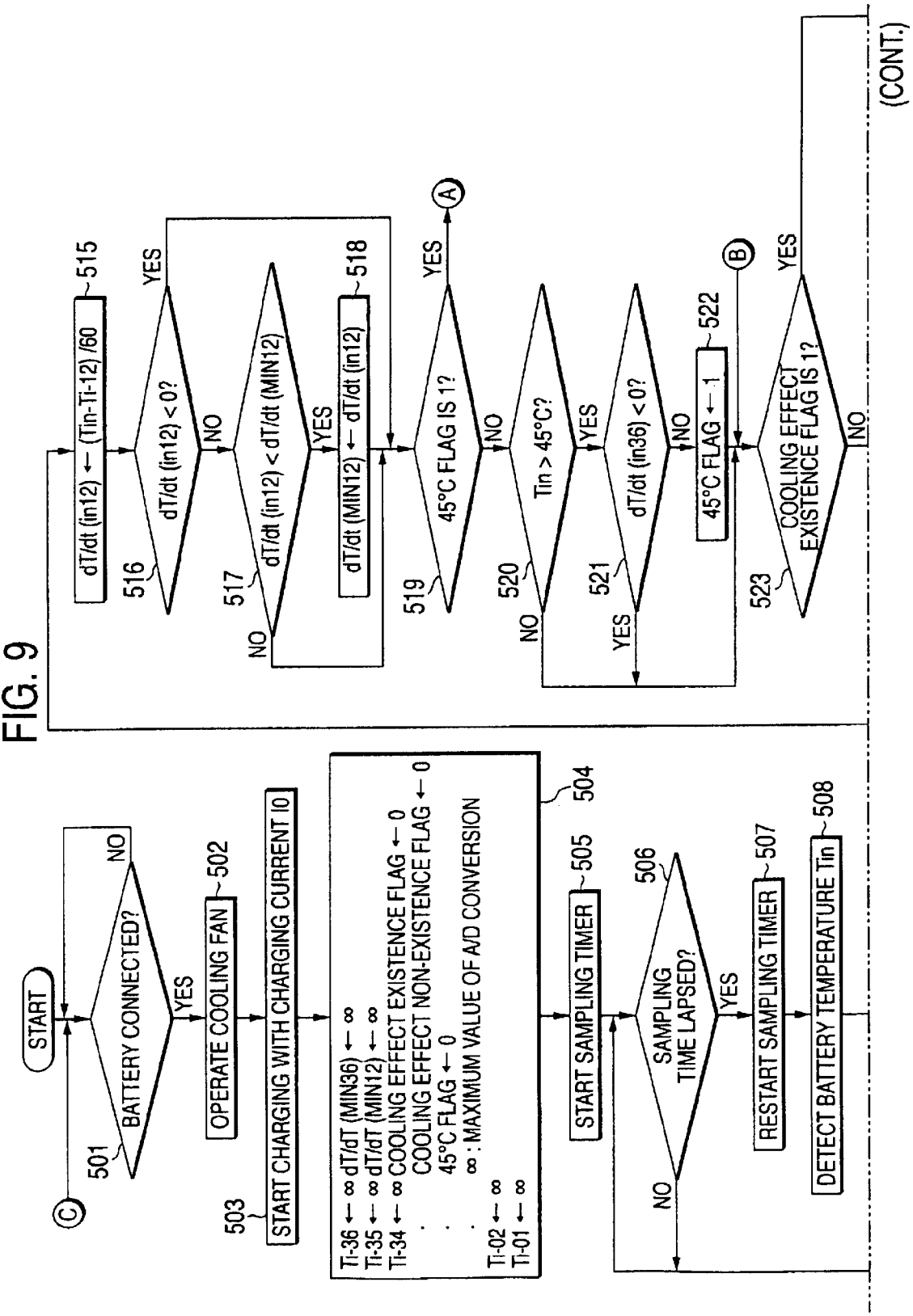
FIG. 9 is a former part of a flowchart for explaining the operation in the case of determining the existence or non-existence of cooling effect depending on whether or not the minimum value of the battery temperature changing rate when the battery temperature during charging operation of the charging apparatus of the invention reaches a predetermined temperature is larger than a preset first predetermined value.
Figure 10:
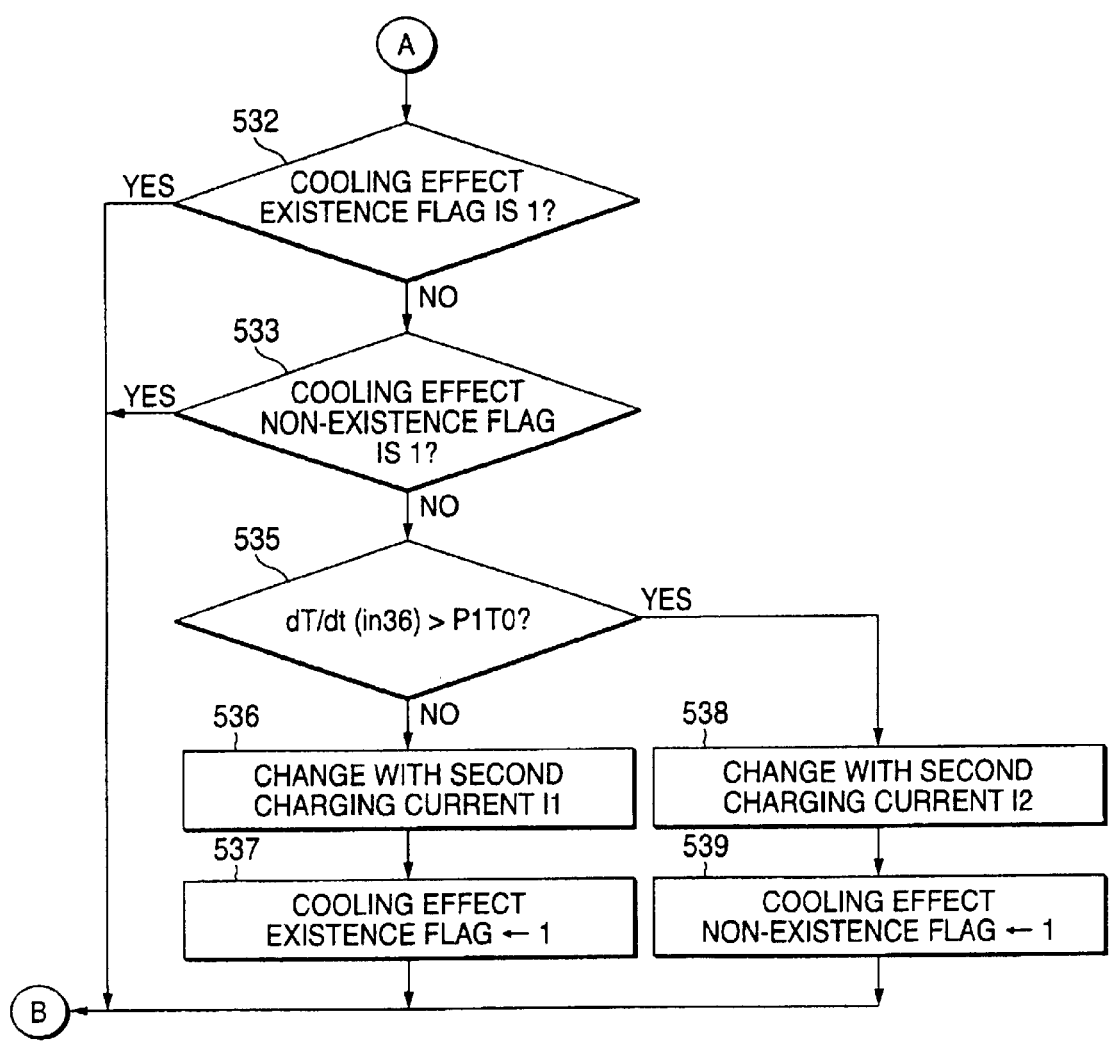
FIG. 10 is a latter part of the flowchart of FIG. 9.

Next, explanation will be made with reference to the block circuit diagram shown in FIG. 7 and the flowcharts shown in FIGS. 9 and 10 as to the operation of the invention in the case of determining the existence or non-existence of the cooling effect depending on whether or not the minimum value of the battery temperature changing rate when the battery temperature during charging reaches the predetermined temperature K is larger than the preset first predetermined value.

When the power supply is turned on, the microcomputer 50 performs the initial setting of the output ports 56a, 56b and is placed in a state of waiting for the connection of the battery pack 2 (step 501). When the battery pack 2 is connected, the cooling fan 6 is operated (step 502) and then the charging operation is started by a charging current I0 (step 503).

Then, the microcomputer initially sets the battery temperatures at the preceding 36 sampling time points Ti-36, Ti-35, - - - , Ti-01 stored in the RAM 53', the minimum value dT/dt(MIN12) of the battery temperature changing rate with the first sampling interval calculated from the newest battery temperature stored in the battery temperature charging rate storage unit 532 and the battery temperature sampled at the preceding twelfth sampling time point, the minimum value dT/dt (MIN36) of the battery temperature changing rate with the second sampling interval calculated from the newest battery temperature and the battery temperature sampled at the preceding thirty-sixth sampling time point, a 45° C. flag, a cooling effect existence flag and a cooling effect non-existence flag (step 504), and starts a sampling timer (step

505). The microcomputer starts the sampling timer again (step 507) when a sampling timer time Δt passes (step 506). In this example, the sampling timer time Δt is set to five seconds. The battery temperature changing rate with the first sampling interval is obtained by dividing a result of subtraction between the newest battery temperature and the battery temperature sampled at the preceding twelve-th sampling time point by 60 seconds corresponding to the time periods of 12 samplings. The battery temperature changing rate with the second sampling interval is obtained by dividing a result of subtraction between the newest battery temperature and the battery temperature sampled at the preceding thirty-six-th sampling time point by 180 seconds corresponding to the time periods of 36 samplings.

Next, the voltage is divided by the resistors 91, 92 of the battery temperature detecting unit 90 and the temperature detecting element 2b, then the A/D converter 55 subjects the voltage thus divided to the A/D conversion and the CPU fetches the voltage thus A/D converted as a battery temperature (step 508). In this case, at the time of starting the sampling timer for the first time (step 509), the battery temperature Tin thus fetched is stored in the battery temperature storage unit 531 as a battery temperature T0 at the time of start of charging (step 510). Next, the battery temperature Ti-36 sampled at the preceding thirty-six-th sampling time point stored in the battery temperature storage unit 531 is subtracted from the battery temperature Tin thus fetched, and then a value obtained from the subtraction is divided by 180 seconds corresponding to the time periods of 36 samplings. Then, a value (Tin−Ti-36)/180 obtained from the division is stored in the battery temperature charging rate storage unit 532 as the battery temperature changing rate dT/dt(in36) with the second sampling interval (step 511). It is determined whether or not the battery temperature changing rate dT/dt(in36) with the second sampling interval is negative (step 512). When it is determined that the battery temperature changing rate is not negative, it is determined that a time equal to or more than 180 seconds corresponding to the time periods of 36 samplings has lapsed, and so the calculation of the battery temperature changing rate with the second sampling interval has been started. Thus, the battery temperature changing rate dT/dt(in36) with the second sampling interval is compared with the minimum value dT/dt(MIN36) of the battery temperature changing rate with the second sampling interval (step 513). When the battery temperature changing rate dT/dt(in36) with the second sampling interval is determined to be smaller than the minimum value dT/dt(MIN36) of the battery temperature changing rate with the second sampling interval, the minimum value dT/dt(MIN36) of the battery temperature changing rate with the second sampling interval is updated (step 514). On the other hand, when the battery temperature changing rate dT/dt(in36) with the second sampling interval is determined to be equal to or larger than the minimum value dT/dt(MIN36) of the battery temperature changing rate with the second sampling interval, the process skips step 514. In step 512, when the battery temperature changing rate dT/dt(in36) with the second sampling interval is determined to be negative, it is determined that a time equal to or more than 180 seconds corresponding to the time periods of 36 samplings does not lapse, and so the calculation of the battery temperature changing rate with the second sampling interval is not started yet. Thus, the process skips steps 513 and 514.

Next, the battery temperature Ti-12 sampled at the preceding twelve-th sampling time point is subtracted from the battery temperature Tin previously fetched, and then a value obtained from the subtraction is divided by 60 seconds corresponding to the time periods of 12 samplings. Then, a value (Tin−Ti-12)/60 obtained from the division is stored in the battery temperature charging rate storage unit 532 as the battery temperature changing rate dT/dt(in12) with the first sampling interval (step 515). It is determined whether or not the battery temperature changing rate dT/dt(in12) with the first sampling interval is negative (step 516). When it is determined that the battery temperature changing rate is not negative, it is determined that a time equal to or more than 60 seconds corresponding to the time periods of 12 samplings has lapsed, and so the calculation of the battery temperature changing rate with the first sampling interval has been started. Thus, the battery temperature changing rate dT/dt(in12) with the first sampling interval is compared with the minimum value dT/dt(MIN12) of the battery temperature changing rate with the first sampling interval (step 517). When the battery temperature changing rate dT/dt(in12) with the first sampling interval is determined to be smaller than the minimum value dT/dt(MIN12) of the battery temperature changing rate with the first sampling interval, the minimum value dT/dt(MIN12) of the battery temperature changing rate with the first sampling interval is updated (step 518). On the other hand, when the battery temperature changing rate dT/dt(in12) with the first sampling interval is determined to be equal to or larger than the minimum value dT/dt(MIN12) of the battery temperature changing rate with the first sampling interval, the process skips step 518. In step 516, when the battery temperature changing rate dT/dt(in12) with the first sampling interval is determined to be negative, it is determined that a time equal to or more than 60 seconds corresponding to the time periods of 12 samplings does not lapse, and so the calculation of the battery temperature changing rate with the first sampling interval is not started yet. Thus, the process skips steps 517 and 518. Next, it is determined whether or not the 45° C. flag is 1 (step 519). When the 45° C. flag is determined not to be 1, it is determined whether or not the Tin reaches 45° C. (step 520). When it is determined that the Tin reaches 45° C., it is determined whether or not the battery temperature changing rate dT/dt(in36) with the second sampling interval is negative (step 521). When the rate dT/dt(in36) is determined not to be negative, the 45° C. flag is set to 1 (step 522).

Next, it is determined whether or not the cooling effect existence flag is 1 (step 523). In step 523, when the cooling effect existence flag is determined to be 1, that is, when the charging current is 11 as described later, the minimum value dT/dt(MIN12) of the battery temperature changing rate with the first sampling interval is subtracted from the newest battery temperature changing rate dT/dt(in12), and the result of the subtraction is compared with the predetermined value N1 thereby to detect the full charge (step 524).

When the result of the subtraction is equal to or less than the predetermined value N1, the respective stored data are respectively moved to the storage areas at preceding one sampling time point in a manner that Ti-35→Ti-36, Ti-34→Ti-35, - - - , Ti-01→Ti-02, Tin→Ti-01(step 528) and the process is returned to step 506 again. In contrast, when the result of the subtraction is more than the predetermined value N1, the charging operation is terminated (step 529). Then, when the battery pack 2 is taken out from the charging apparatus (step 530), operation of the cooling fan 6 is stopped (step 531) and then the process returns to step 501 again.

In step 523, when the cooling effect existence flag is determined not to be 1, then it is determined whether or not the cooling effect non-existence flag is 1 (step 525). When the cooling effect non-existence flag is determined to be 1 in step 525, that is, when the charging current is I2 as described later, the minimum value dT/dt(MIN12) of the battery temperature changing rate with the first sampling interval is subtracted from the newest battery temperature changing rate dT/dt(in12), and the result of the subtraction is compared with the predetermined value N2 thereby to detect the full charge (step 526).

When the result of the subtraction is equal to or less than the predetermined value N2, the respective stored data are respectively moved to the storage areas at preceding one sampling time point in a manner that Ti-35→Ti-36, Ti-34→Ti-35, - - - , Ti-01→Ti-02, Tin→Ti-01 (step 528) and the process is returned to step 506 again. In contrast, when the result of the subtraction is more than the predetermined value N2, the charging operation is terminated (step 529). Then, when the battery pack 2 is taken out from the charging apparatus (step 530), operation of the cooling fan 6 is stopped (step 531) and then the process returns to step 501 again.

In step 525, when the cooling effect non- existence flag is determined not to be 1, the charging is performed by the charging current I0. Then, the minimum value dT/dt (MIN12) of the battery temperature changing rate with the first sampling interval is subtracted from the newest battery temperature changing rate dT/dt(in12), and the result of the subtraction is compared with the predetermined value N0 thereby to detect the full charge (step 527).

When the result of the subtraction is equal to or less than the predetermined value N0, the respective stored data are respectively moved to the storage areas at preceding one sampling time point in a manner that Ti-35→Ti-36, Ti-34→Ti-35, - - - , Ti-01→Ti-02, Tin→Ti-01 (step 528) and the process is returned to step 506 again. In contrast, when the result of the subtraction is more than the predetermined value N0, the charging operation is terminated (step 529). Then, when the battery pack 2 is taken out from the charging apparatus (step 530), operation of the cooling fan 6 is stopped (step 531) and then the process returns to step 501 again.

When it is determined that the battery temperature does not reach 45° C. in step 520, the process skips steps 521 and 522. Further, when it is determined that the battery temperature changing rate dT/dt(in36) with the second sampling interval is negative in step 521, the process skips step 522.

When it is determined that the 45° C. flag is 1 in step 519, it is determined whether or not the cooling effect existence flag is 1 (step 532). When the cooling effect existence flag is determined to be 1, the process proceeds to step 523. In contrast, when the cooling effect existence flag is determined not to be 1, it is determined whether or not the cooling effect non-existence flag is 1 (step 533). When the cooling effect non-existence flag is determined to be 1, the process proceeds to step 523. When the cooling effect non-existence flag is determined not to be 1, a predetermined value P1T0 based on the battery temperature T0 at the time of start of charging is compared with the battery temperature changing rate dT/dt(in36) with the second sampling interval (step 535). When the battery temperature changing rate dT/dt (in36) with the second sampling interval is determined to be equal to or smaller than the predetermined value P1T0 based on the battery temperature T0 at the time of start of charging, it is determined that cooling effect exists. Then, the charging operation is performed with the first charging current I1 (<I0) which is the maximum current value capable of suppressing the degradation of the life time of the battery due to heat generated by the battery pack 2 taking into consideration of the existence of the cooling effect (step 536), then the cooling effect existence flag is set to 1 (step 537) and then the process proceeds to step 523.

When the battery temperature changing rate dT/dt(in36) with the second sampling interval is determined to be larger than the predetermined value P1T0 based on the battery temperature T0 at the time of start of charging, it is determined that cooling effect does not exist. Then, the charging operation is performed with the second charging current I2 (<I1) which is the maximum current value capable of suppressing the degradation of the life time of the battery due to heat generated by the battery pack 2 taking into consideration of the non-existence of the cooling effect (step 538), then the cooling effect non-existence flag is set to 1 (step 539) and then the process proceeds to step 523.

Figure 12:
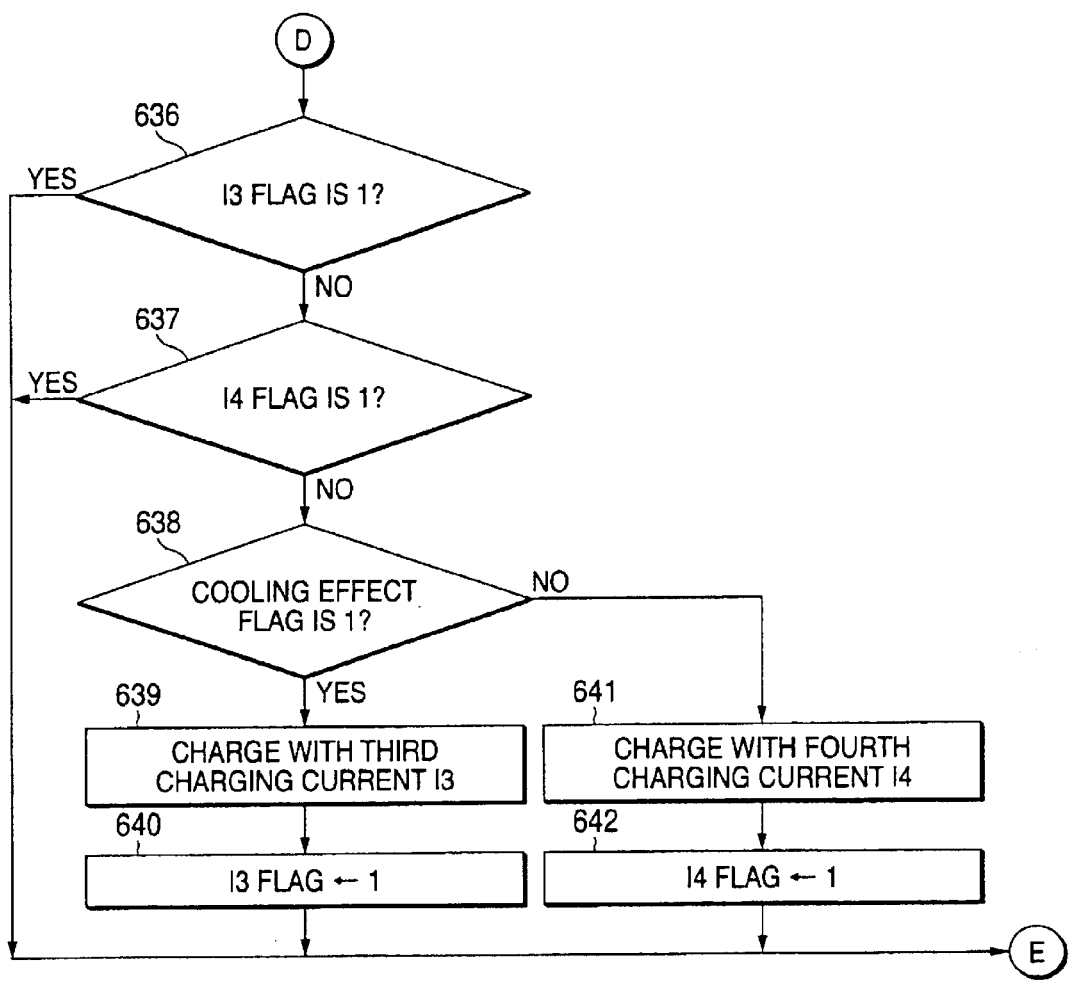
FIG. 12 is a latter part of the flowchart of FIG. 11.

Next, explanation will be made with reference to the block circuit diagram shown in FIG. 7 and the flowcharts shown in FIGS. 11 and 12 as to the operation of the invention in the case of determining the existence or non-existence of the cooling effect depending on whether or not the minimum value of the battery temperature changing rate when the battery temperature during charging reaches the predetermined temperature K is larger than the preset first predetermined value.

When the power supply is turned on, the microcomputer 50 performs the initial setting of the output ports 56a, 56b and is placed in a state of waiting for the connection of the battery pack 2 (step 601). When the battery pack 2 is connected, the cooling fan 6 is operated (step 602) and then the charging operation is started by the charging current I0 (step 603).

Then, the microcomputer initially sets the battery temperatures at the preceding 36 sampling time points Ti-36, Ti-35, - - - , Ti-01 stored in the battery temperature storage unit 531, the minimum value dT/dt(MIN12) of the battery temperature changing rate with the first sampling interval calculated from the newest battery temperature stored in the battery temperature charging rate storage unit 532 and the battery temperature sampled at the preceding twelfth sampling time point, a cooling effect flag, a cooling effect determination termination flag, a 45° C. flag, an I3 flag and an I4 flag (step 604), and starts a sampling timer (step 605). The microcomputer starts the sampling timer again (step 607) when a sampling timer time Δt passes (step 606). In this example, the sampling timer time Δt is set to five seconds. The battery temperature changing rate with the first sampling interval is obtained by dividing a result of subtraction between the newest battery temperature and the battery temperature sampled at the preceding twelve-th sampling time point by 60 seconds corresponding to the time periods of 12 samplings. The battery temperature changing rate with the second sampling interval is obtained by dividing a result of subtraction between the newest battery temperature and the battery temperature sampled at the preceding thirty-sixth sampling time point by 180 seconds corresponding to the time periods of 36 samplings.

Next, the resistors 91, 92 of the battery temperature detecting unit 90 divides the battery temperature Tin, then the A/D converter 55 subjects the voltage thus divided to the A/D conversion and the CPU fetches the voltage thus A/D converted as a battery temperature (step 608). In this case, at the time of starting the sampling timer for the first time (step 609), the battery temperature Tin thus fetched is stored in the battery temperature storage unit 531 as a battery temperature T0 at the time of start of charging (step 610). Next, the battery temperature sampled at the preceding thirty-sixth sampling time point is subtracted from the battery temperature Tin, and then a value obtained from the subtraction is divided by 180 seconds corresponding to the time periods of 36 samplings. Then, a value (Tin−Ti-36)/180 obtained from the division is stored in the battery temperature charging rate storage unit 532 as the battery temperature changing rate dT/dt(in36) with the second sampling interval (step 611).

Next, it is determined whether or not the cooling effect determination termination flag is 1 (step 612). When the cooling effect determination termination flag is determined not to be 1, it is determined whether or not the battery temperature changing rate dT/dt(in36) with the second sampling interval is negative (step 613). When it is determined that the battery temperature changing rate is not negative, it is determined that a time equal to or more than 180 seconds corresponding to the time periods of 36 samplings has lapsed, and so the calculation of the battery temperature changing rate with the second sampling interval has been started. Thus, the battery temperature changing rate dT/dt (in36) with the second sampling interval is compared with a predetermined value P2T0 based on the battery temperature T0 at the time of start of charging (step 615). When the battery temperature changing rate dT/dt(in36) with the second sampling interval is determined to be equal to or smaller than the predetermined value P2T0 based on the battery temperature T0 at the time of start of charging, it is determined that the cooling effect exists and so the cooling effect flag is set to 1 (step 616). Then, the cooling effect determination termination flag is set to 1. In contrast, when the battery temperature changing rate dT/dt(in36) with the second sampling interval is determined to be larger than the predetermined value P2T0 based on the battery temperature T0 at the time of start of charging, it is determined that the cooling effect does not exist and so the cooling effect flag is set to 0 (step 617). Then, the cooling effect determination termination flag is set to 1 in step 618.

In step 612, it is determined whether or not the cooling effect determination termination flag is 1. When the cooling effect determination termination flag is determined to be 1, the process in step 619 is performed.

In step 613, when it is determined that the battery temperature changing rate dT/dt(in36) with the second sampling interval is negative, the process in step 619 is performed.

Next, the battery temperature Ti-12 sampled at the preceding twelfth sampling time point is subtracted from the battery temperature Tin previously fetched, and then a value obtained from the subtraction is divided by 60 seconds corresponding to the time periods of 12 samplings. Then, a value (Tin−Ti-12)/60 obtained from the division is stored in the battery temperature charging rate storage unit 532 as the battery temperature changing rate dT/dt(in12) with the first sampling interval (step 619). It is determined whether or not the battery temperature changing rate dT/dt(in12) with the first sampling interval is negative (step 620). When it is determined that the battery temperature changing rate is not negative, it is determined that a time equal to or more than 60 seconds corresponding to the time periods of 12 samplings has lapsed, and so the calculation of the battery temperature changing rate with the first sampling interval has been started. Thus, the battery temperature changing rate dT/dt(in12) with the first sampling interval is compared with the minimum value dT/dt(MIN12) of the battery temperature changing rate with the first sampling interval (step 621). When the battery temperature changing rate dT/dt(in12) with the first sampling interval is determined to be smaller than the minimum value dT/dt(MIN12) of the battery temperature changing rate with the first sampling interval, the minimum value dT/dt(MIN12) of the battery temperature changing rate with the first sampling interval is updated (step 622). On the other hand, when the battery temperature changing rate dT/dt(in12) with the first sampling interval is determined to be equal to or larger than the minimum value dT/dt(MIN12) of the battery temperature changing rate with the first sampling interval, the process skips step 622. In step 620, when the battery temperature changing rate dT/dt(in12) with the first sampling interval is determined to be negative, it is determined that a time equal to or more than 60 seconds corresponding to the time periods of 12 samplings does not lapse, and so the calculation of the battery temperature changing rate with the first sampling interval is not started yet. Thus, the process skips steps 621 and 622.

Next, it is determined whether or not the 45° C. flag is 1 (step 623). When the 45° C. flag is determined not to be 1, it is determined whether or not the battery temperature Tin reaches 45° C. (step 624). When it is determined that the Tin reaches 45° C., it is determined whether or not the battery temperature changing rate dT/dt(in36) with the second sampling interval is negative (step 625). When the rate dT/dt (in36) is determined not to be negative, the 45° C. flag is set to 1 (step 626).

Next, it is determined whether or not the I3 flag is 1 (step 627). In step 627, when the I3 flag is determined to be 1, that is, when the charging current is I3 as described later, the minimum value dT/dt(MIN12) of the battery temperature changing rate with the first sampling interval is subtracted from the newest battery temperature changing rate dT/dt (in12), and the result of the subtraction is compared with the predetermined value N3 thereby to detect the full charge (step 628).

When the result of the subtraction is equal to or less than the predetermined value N3, the respective stored data are respectively moved to the storage areas at preceding one sampling time point in a manner that Ti-35→Ti-36, Ti-34→Ti-35, - - - , Ti-01→Ti-02, Tin→Ti-01 (step 632) and the process is returned to step 606 again. In contrast, when the result of the subtraction is more than the predetermined value N3, the charging operation is terminated (step 633). Then, when the battery pack 2 is taken out from the charging apparatus (step 634), operation of the cooling fan 6 is stopped (step 635) and then the process returns to step 601 again.

In step 627, when the I3 flag is determined not to be 1, then it is determined whether or not the I4 flag is 1 (step 629). When the I4 flag is determined to be 1 in step 629, that is, when the charging current is I4 as described later, the minimum value dT/dt(MIN12) of the battery temperature changing rate with the first sampling interval is subtracted from the newest battery temperature changing rate dT/dt (in12), and the result of the subtraction is compared with the predetermined value N4 thereby to detect the full charge (step 630).

When the result of the subtraction is equal to or less than the predetermined value N4, the respective stored data are respectively moved to the storage areas at preceding one sampling time point in a manner that Ti-35→Ti-36, Ti-34→Ti-35, - - - , Ti-01→Ti-02, Tin→Ti-01 (step 632) and the process is returned to step 606 again. In contrast, when the result of the subtraction is more than the predetermined value N4, the charging operation is terminated (step 633). Then, when the battery pack 2 is taken out from the charging apparatus (step 634), operation of the cooling fan 6 is stopped (step 635) and then the process returns to step 601 again.

In step 629, when the I4 flag is determined not to be 1, the charging is performed by the charging current I0. Then, the minimum value dT/dt(MIN12) of the battery temperature changing rate with the first sampling interval is subtracted from the newest battery temperature changing rate dT/dt (in12), and the result of the subtraction is compared with the predetermined value N0 thereby to detect the full charge (step 631).

When the result of the subtraction is equal to or less than the predetermined value N0, the respective stored data are respectively moved to the storage areas at preceding one sampling time point in a manner that Ti-35→Ti-36, Ti-34→Ti-35, - - - , Ti-01→Ti-02, Tin→T1-01 (step 632) and the process is returned to step 606 again. In contrast, when the result of the subtraction is more than the predetermined value N0, the charging operation is terminated (step 633). Then, when the battery pack 2 is taken out from the charging apparatus (step 634), operation of the cooling fan 6 is stopped (step 635) and then the process returns to step 601 again.

When it is determined that the battery temperature does not reach 45° C. in step 624, the process skips steps 625 and 626. Further, when it is determined that the battery temperature changing rate dT/dt(in36) with the second sampling interval is negative in step 625, the process skips step 626.

When it is determined that the 45° C. flag is 1 in step 623, it is determined whether or not the I3 flag is 1 (step 636). When the I3 flag is determined to be 1, the process proceeds to step 627. In contrast, when the I3 flag is determined not to be 1 in step 636, it is determined whether or not the I4 flag is 1 (step 637). In step 637, when the I4 flag is determined to be 1, the process proceeds to step 627. When the I4 flag is determined not to be 1, it is determined whether the cooling effect flag is 1 or not (step 638). When it is determined the cooling effect flag to be 1, the charging operation is performed with the third charging current I3 (<I0) which is the maximum current value capable of suppressing the degradation of the life time of the battery due to heat generated by the battery pack 2 taking into consideration of the existence of the cooling effect (step 639), then the I3 flag is set to 1 (step 640) and then the process proceeds to step 627. In contrast, when it is determined that cooling effect flag is not 1 in step 638, the charging operation is performed with the fourth charging current I4 (<I3) which is the maximum current value capable of suppressing the degradation of the life time of the battery due to heat generated by the battery pack 2 taking into consideration of the non-existence of the cooling effect (step 641), then the I4 flag is set to 1 (step 642) and then the process proceeds to step 627.

Since the non-existence or existence of the cooling effect is determined in this manner, when the vent hole of the battery pack and the charging apparatus is clogged due to mixing of a foreign body etc. in the battery pack with a cooling device, it is determined that there is not cooling effect and so the charging operation can be performed suitably.

As described above, according to the invention, in each of the battery pack with a cooling device and the battery pack without a cooling device, accurate full-charge detection control can be performed and the charging operation can be made with a suitable and accurate charging current.

What is claimed is:

1. A charging apparatus, comprising:
a cooling fan for cooling a battery pack;
a battery temperature detecting unit configured to detect a battery temperature of the battery pack; and
a control unit configured to determine presence or non-presence of cooling effect, to determine full charge of the battery and to control a charging current based on an output of the battery temperature detecting unit;
wherein, when the control unit determines that there is no cooling effect by the cooling fan and the battery temperature reaches a first predetermined value smaller than a maximum value of a temperature range in which the battery is chargeable without making a life time thereof shorter, the control unit changes the charging current to a first charging current value where increase of the battery temperature due to charging is suppressed; and
wherein, when the control unit determines that there is cooling effect by the cooling fan and the battery temperature reaches a second predetermined value higher than the first predetermined value, the control unit changes the charging current to a second charging current value larger than the first charging current value.

2. A charging apparatus, comprising:
a cooling fan for cooling a battery pack;
a battery temperature detecting unit configured to detect a temperature of a battery;
a battery temperature storage unit configured to store a battery temperature based on an output from the battery temperature detecting means;
a battery temperature changing rate calculation unit configured to calculate a plurality of battery temperature changing rates with different sampling intervals including a first sampling interval and a second sampling interval longer than the first sampling interval, based on outputs from the battery temperature detecting unit and the battery temperature storage unit; and
a battery temperature changing rate storage unit configured to store the plurality of battery temperature changing rates based on an output from the battery temperature changing rate calculation unit;
wherein a full charge state of the battery pack is detected by a battery temperature changing rate with the first sampling interval based on an output from the battery temperature changing rate calculation unit and the battery temperature changing rate storage unit; and
existence or non-existence of cooling effect due to the cooling fan is determined by a battery temperature changing rate with the second sampling interval.

3. A charging apparatus, comprising:
a cooling fan for cooling a battery pack;
a battery temperature detecting unit configured to detect a temperature of a battery;
a battery temperature storage unit configured to store a battery temperature based on an output from the battery temperature detecting means;
a battery temperature changing rate calculation unit configured to calculate a plurality of battery temperature changing rates based on outputs from the battery temperature detecting unit and the battery temperature storage unit; and
a battery temperature changing rate storage unit configured to store the plurality of battery temperature changing rates based on an output from the battery temperature changing rate calculation unit;
wherein the battery temperature changing rate storage unit stores a minimum value of the battery temperature changing rates; and wherein existence or non-existence of cooling effect due to the cooling fan is determined depending on whether or not the minimum value of the battery temperature changing rates when the battery temperature during a charging operation reaches a predetermined temperature is larger than a preset first predetermined value.

4. The charging apparatus according to claim 3, wherein the first predetermined value is set in correspondence with a battery temperature at a time of start of charging.

5. A charging apparatus, comprising:

a cooling fan for cooling a battery pack;

a battery temperature detecting unit configured to detect a temperature of a battery;

a battery temperature storage unit configured to store a battery temperature based on an output from the battery temperature detecting means;

a battery temperature changing rate calculation unit configured to calculate a plurality of battery temperature changing rates based on outputs from the battery temperature detecting unit and the battery temperature storage unit; and a battery temperature changing rate storage unit configured to store the plurality of battery temperature changing rates based on an output from the battery temperature changing rate calculation unit;

wherein existence or non-existence of cooling effect due to the cooling fan is determined depending on whether or not a battery temperature changing rate calculated for the first time by the battery temperature changing rate calculation unit is larger than a preset second predetermined value.

6. The charging apparatus according to claim 5, wherein the second predetermined value for determining the existence or non-existence of cooling effect is set in correspondence with a battery temperature at a time of start of charging.

* * * * *